(12) United States Patent
Conley et al.

(10) Patent No.: US 11,347,459 B2
(45) Date of Patent: May 31, 2022

(54) METHOD FOR PRODUCING WORST-CASE COMPARISON OF GREEDY AND OPTIMAL SHEET SCHEDULING

(71) Applicant: Xerox Corporation, Norwalk, CT (US)

(72) Inventors: John H. Conley, Rochester, NY (US); Jennifer Anglum, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 51 days.

(21) Appl. No.: 17/068,891

(22) Filed: Oct. 13, 2020

(65) Prior Publication Data

US 2022/0113917 A1    Apr. 14, 2022

(51) Int. Cl.
*G06F 3/12* (2006.01)

(52) U.S. Cl.
CPC ............ *G06F 3/126* (2013.01); *G06F 3/1211* (2013.01)

(58) Field of Classification Search
None
See application file for complete search history.

(56) References Cited

U.S. PATENT DOCUMENTS

| | | | |
|---|---|---|---|
| 5,835,688 A | 11/1998 | Fromherz | |
| 6,097,500 A * | 8/2000 | Fromherz | G03G 15/231 358/1.15 |
| 10,025,544 B1 * | 7/2018 | Brahma | G06F 3/1273 |

OTHER PUBLICATIONS

Lawler, E.L.: "The Minimal Cost-to-Time Ratio Cycle Problem" in Combinatorial Optimization: Networks and Matroids. Holt, Rinehart and Winston (1976).
Fiala, E.R. and Greene, D.H: Data Compression with Finite Windows. Commun. ACM 32, 4 (1983), https://dl.acm.org/doi/abs/10.1145/63334.63341, last accessed Feb. 16, 2021.
U.S. Appl. No. 16/662,324, filed Oct. 24, 2019.

* cited by examiner

*Primary Examiner* — Paul F Payer
(74) *Attorney, Agent, or Firm* — Simpson & Simpson, PLLC; Michael Nicholas Vranjes

(57) ABSTRACT

A method of generating a comparison of optimal sheet scheduling to greedy sheet scheduling, the method comprising receiving, by one or more computer processors, one or more print requests, generating, by the one or more computer processors, a greedy finite state machine based on the one or more print requests, generating, by the one or more computer processors, an optimal finite state machine based on the one or more print requests, generating, by the one or more computer processors, a cross product of the optimal finite state machine and the greedy finite state machine, identifying, by the one or more computer processors, a cycle in the cross product, and generating, by the one or more computer processors, a minimum ratio of optimal cost to greedy cost.

20 Claims, 7 Drawing Sheets

METHOD FOR PRODUCING WORST-CASE COMPARISON OF GREEDY AND OPTIMAL SHEET SCHEDULING

FIELD

The present disclosure relates to the field of schedulers for printing, and more particularly, to the method of generating a comparison of optimal sheet scheduling to greedy sheet scheduling.

BACKGROUND

The scheduling of sheets through a marker paper path is complex. The paper path begins when a sheet enters the marker paper path and continues to the point where a first image is applied. In the case of a duplex print, where the sheet requires a second image, the sheet is inverted as it goes around a duplex loop leading back to the image transfer point. Finally, the sheet exits the marker, optionally passing through a second inverter.

The marker paper path has capabilities that produce different types of prints according to the various pathways taken by the sheet. For example, a simplex face-up print receives only one image and exits without inversion. A duplex face-up sheet has images on both sides and is inverted on the way out. Output face orientation and number of images are generally the distinctive attributes, but others, such as sheet process length, are also factors.

The job of the sheet scheduler is to determine the time when a sheet with given attributes exits the marker. A desirable goal is to be optimal. An "optimal" scheduling method aims to schedule a job so that the last sheet exits the marker paper path as soon as possible. A "greedy" scheduling method simply assigns the next available time for a sheet to exit the marker, subject to it not interfering with other sheets in the path. The greedy scheduling method turns out to be optimal for jobs comprising sheets with identical attributes, for example, all duplex face-up sheets. In other cases, it sometimes is better to delay a sheet exit time in order to accommodate a later sheet (i.e., doing so may reduce overall operation time and thus cost).

An example using a simple three-sheet paper path can be used to illustrate this. Two kinds of print capabilities are scheduled, duplex and simplex, with neither using the output inverter. A timeline for a duplex sheet is represented by f _ _ d with "f" indicating the first side image transfer and "d" indicating the second side transfer image, the latter occurring three sheet units later. In the example shown above, f and d are separated by the duplex loop time, which is equivalent to the process length of two sheets. Thus, "_" represents one sheet. Each of f, d, and _ represent a single "pitch," or a space on the duplex loop in which one whole sheet fits (i.e., a sheet space). As such, in some embodiments, the entire marker paper path may comprise three pitches, e.g., f _ _, with d beginning the new set of three pitches. In some embodiments, the entire marker paper path may comprise one or more pitches (e.g., seventeen pitches). Extended by a simplex sheet, the timeline is f _ _ d s where "s" denotes the simplex transfer occurring at the next available time after the duplex second side.

Consider a simplex sheet. The greedy scheduler would send out the sheet as soon as possible. Assuming this is the earliest possible time, this schedule would be optimal if the next three sheets are either all simplex or all duplex. The before-and-after timelines below show this, where the bold "s" is the initial simplex sheet. As shown below, three simplex sheets are ordered following an initial simplex sheet:

s -> s s s s

Below shows three duplex sheets ordered following an initial simplex sheet:

s -> s f f f d d d

In both examples, there is no need for a pitch or sheet delay for the greedy scheduler, which actually turns out to also be the optimal schedule, for three consecutive simplex prints after a simplex print or three consecutive duplex prints after a simplex print. Delaying one pitch or sheet, before scheduling the simplex print, is optimal if the next three sheets are duplex, simplex, and then duplex, as shown below.

s -> f s f d s d

As shown in the example above "_ s" represents one pitch delay before scheduling the simplex "s" sheet. Thus, it is optimal to schedule the first duplex print f, then the first simplex print, then the second duplex print. Delaying two pitches, before scheduling the simplex print, would be optimal if the next two sheets are duplex, as shown below.

_ _ s -> f f s d d

There is a tradeoff between simplicity and productivity: greedy schedules would not be optimal for the last two jobs; however, an optimizing scheduler would have to look ahead in the job in order to choose the correct pitch delay. It is very difficult to determine whether greedy scheduling or optimal scheduling should be used (i.e., assessing the productivity cost of greedy scheduling relative to optimal scheduling).

Therefore, there is a long felt need for a system and method for assessing the productivity cost of greedy scheduling relative to optimal scheduling for a given set of machine capabilities.

SUMMARY

According to aspects illustrated herein, there is provided a method of generating a comparison of optimal sheet scheduling to greedy sheet scheduling, the method comprising receiving, by one or more computer processors, one or more print requests and associated paper path timing constraints, generating, by the one or more computer processors, a greedy finite state machine based on the one or more print requests, generating, by the one or more computer processors, an optimal finite state machine based on the one or more print requests, generating, by the one or more computer processors, a cross product of the optimal finite state machine and the greedy finite state machine, identifying, by the one or more computer processors, all cycles in the cross product, and finding, by the one or more computer processors, a minimum ratio of optimal cost to greedy cost.

In some embodiments, the one or more print requests comprise one or more simplex prints and/or one or more duplex prints. In some embodiments, the step of generating a greedy finite state machine comprises generating, by the one or more computer processors, a greedy print schedule for each of the one or more print requests by assigning the one or more print requests to first available pitches to create one or more first transitions and one or more first states. In some embodiments, the step of generating a greedy finite state machine further comprises assigning, by the one or more computer processors, the one or more first transitions and the one or more first costs. The step of generating a greedy scheduling finite state machine further comprises applying the foregoing operations to newly created states for as long as new states are created. In some embodiments, the step of generating an optimal finite state machine comprises first generating, by the one or more computer processors, a greedy scheduling finite state machine. The step of generating an optimal scheduling finite state machine further comprises assigning in every state the one or more print requests to pitches based on a reduced overall operating time to create one or more additional transitions and one or more additional states, and assigning, by the one or more computer processors, the one or more additional transitions and one or more second costs. The step of generating an optimal scheduling finite state machine further comprises applying the immediately foregoing operation to newly created states for as long as new states are created. In some embodiments, the step of generating a cross product of the optimal finite state machine and the greedy finite state machine comprises generating, by the one or more computer processors, a transition diagram including a plurality of cross product states and one or more cross product transitions. In some embodiments, the step of identifying a cycle in the cross product comprises identifying, by the one or more computer processors, all cycle states in the plurality of cross product states, and identifying, by the one or more computer processors, cycle transitions of the one or more cross product transitions that connect the cycle states. In some embodiments, the step of finding a minimum ratio of optimal cost to greedy cost includes adding, by the one or more computer processors, the one or more first costs of the cycle transitions, and adding, by the one or more computer processors, the one or more second costs of the cycle transitions.

According to aspects illustrated herein, there is provided a computer system for generating a worst-case comparison of optimal sheet scheduling to greedy sheet scheduling, comprising one or more computer processors, one or more computer readable storage media, program instructions stored on the computer readable storage media for execution by at least one of the one or more computer processors, the program instructions comprising program instructions to receive input data related to one or more images to be printed, program instructions to generate a greedy finite state machine based on the input data, program instructions to generate an optimal finite state machine based on the input data, program instructions to generate a cross product of the optimal finite state machine and the greedy finite state machine, program instructions to identify a cycle in the cross product, and program instructions to generate a minimum ratio of optimal cost to greedy cost.

In some embodiments, the program instructions to generate a greedy finite state machine comprise program instructions to generate a greedy print schedule by assigning the one or more print requests to first available pitches to create one or more first transitions and one or more first states, and program instructions to assign the one or more first transitions one or more first capabilities and one or more first costs. In some embodiments, the program instructions to generate an optimal finite state machine comprise program instructions to generate an optimal print schedule by assigning the one or more print requests to pitches based on a reduced overall operating time to create one or more second transitions and one or more second states, and program instructions to assign the one or more second transitions one or more second capabilities and one or more second costs. In some embodiments, the program instructions to generate a cross product of the optimal finite state machine and the greedy finite state machine comprise program instructions to generate a transition diagram including a plurality of cross product states and one or more cross product transitions. In some embodiments, the program instructions to identify a cycle in the cross product comprise program instructions to identify cycle states of the plurality of cross product states, and program instructions to identify cycle transitions of the one or more cross product transitions that connect the cycle states. In some embodiments, the program instructions to generate a minimum ratio of optimal cost to greedy cost include program instructions to add the one or more first costs of the cycle transitions, and program instructions to add the one or more second costs of the cycle transitions.

According to aspects illustrated herein, there is provided a computer program product for generating a worst-case comparison of optimal sheet scheduling and greedy sheet scheduling on a duplex printing system, the computer program product comprising a computer readable storage medium and program instructions stored on the computer readable storage medium, the program instructions comprising program instructions to receive input data related to one or more images to be printed, program instructions to generate a greedy finite state machine based on the input data, program instructions to generate an optimal finite state machine based on the input data, program instructions to generate a cross product of the optimal finite state machine and the greedy finite state machine, program instructions to identify a cycle in the cross product, and program instructions to generate a minimum ratio of optimal cost to greedy cost.

In some embodiments, the program instructions to generate a greedy finite state machine comprise program instructions to generate a greedy print schedule by assigning the one or more print requests to first available pitches to create one or more first transitions and one or more first states, and program instructions to assign the one or more first transitions one or more first capabilities and one or more first costs. In some embodiments, the program instructions to generate an optimal finite state machine comprise program instructions to generate an optimal print schedule by assigning the one or more print requests to pitches based on a reduced overall operating time to create one or more second transitions and one or more second states, and program instructions to assign the one or more second transitions one or more second capabilities and one or more second costs. In some embodiments, the program instructions to generate a cross product of the optimal finite state machine and the greedy finite state machine comprise program instructions to generate a transition diagram including a plurality of cross product states and one or more cross product transitions. In some embodiments, the program instructions to identify a cycle in the cross product comprise program instructions to identify cycle states of the plurality of cross product states, and program instructions to identify cycle transitions of the one or more cross product transitions that connect the cycle states. In some embodiments, the program instructions to generate a minimum ratio of optimal cost to greedy cost include program instructions to add the one or more first costs of the cycle transitions, and program instructions to add the one or more second costs of the cycle transitions.

According to aspects illustrated here, there is provided an assessment method for assessing the productivity cost of greedy scheduling relative to optimal scheduling for a given set of print requests. The assessment method is based on scheduling with a finite state machine (FSM). The FSM states correspond to the occupancy of the maximum portion of the paper path that is accessible to the scheduler by any print request. For example, the state of a pitch indicates whether that pitch is occupied or unoccupied. The transitions between states correspond to the scheduling of a print request. Both greedy scheduling and optimal scheduling can be controlled by FSMs. Greedy FSMs are deterministic, with each capability having one transition from any state at the smallest possible cost (i.e., in any state, there is only one transition possibility). Optimal FSMs are non-deterministic since each state may contain multiple transitions on a capability, one for each potentially useful delay (i.e., multiple transition possibilities). Thus, greedy FSMs schedule the next available sheet to exit, whereas optimal FSMs consider the possibility of delaying the exit of a sheet.

The assessment of greedy versus optimal scheduling is the result of analyzing the cross product (CP) of the greedy and optimal FSMs. The CP states derive from the cross product of the component FSM states. Similarly, the CP transitions are based on transitions out of the component FSM states; the cost of a CP transition on a sheet type is a pair, one value from the greedy transition and the other from an optimal FSM transition. The CP FSM represents the actions of both greedy and optimizing schedulers executed in parallel. The CP analysis finds a cycle in the graph with minimum ratio of optimal to greedy costs. For example, if the smallest ratio is 12, then the greedy scheduler for sheets along the cycle is twice the cost of the optimal schedule. In addition, this is the worst case because the ratio is minimal.

To summarize, given a set of machine capabilities: 1) generate the optimal FSM; 2) generate the greedy FSM; 3) generate the CP of the optimal FSM (determined in step 1) and the greedy FSM (determined in step 2); and, 4) find a cycle in CP with minimum ratio of optimal to greedy cost. This ratio represents the worst-case performance of greedy versus optimal scheduling.

It should be appreciated that FSM scheduling can be extended to a paper path encompassing multiple machine modules, for example feeders, markers, and finishers. The method of the present disclosure applies to the extended cases.

The system and method of the present disclosure has the following key advantages. The system and method of the present disclosure provides a measure of the worst-case productivity cost of greedy scheduling. The system and method of the present disclosure can identify areas for improvement. The jobs recognized along any CP cycle could be measured and flagged for custom scheduling. The system and method of the present disclosure allows for the possibility of analyzing other types of alternatives to optimal, such as running simplex prints through the duplex loop, fractional sheet delays, and restricted non-deterministic FSM scheduling, for example, allowing at most two transitions per capability. This saves scheduler memory at potential productivity cost. Fractional sheet delays are explained in U.S. patent application Ser. No. 16/662,324 (Conley et al.), which application is incorporated herein by reference in its entirety.

In some embodiments, FSM generation operates on instances of print requests and their paper path timing constraints. The input is not a print job to be scheduled but rather the set of exemplary print requests that can appear in any print job. To generate a scheduling FSM, begin with a state representing the end of the initial paper path, for example, a full path. Then, for every state, schedule every type of print request, generating transitions to other states. Apply this operation to any new states that appear in the generated transitions until there are no more new states.

In some embodiments, a print request is fulfilled by executing a series of machine capabilities, for example, feed a sheet of paper from a tray, mark the paper, and add the sheet to a stack of completed prints. Together, these capabilities affect the state of the paper path at various times and is the basis of the FSM. It is not necessary to distinguish print requests and capabilities because print requests stand for whatever capabilities underlie the FSM.

In some embodiments, given the cross product FSM, the object of the present disclosure is to identify all of its cycles and find one with the minimum cost ratio.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
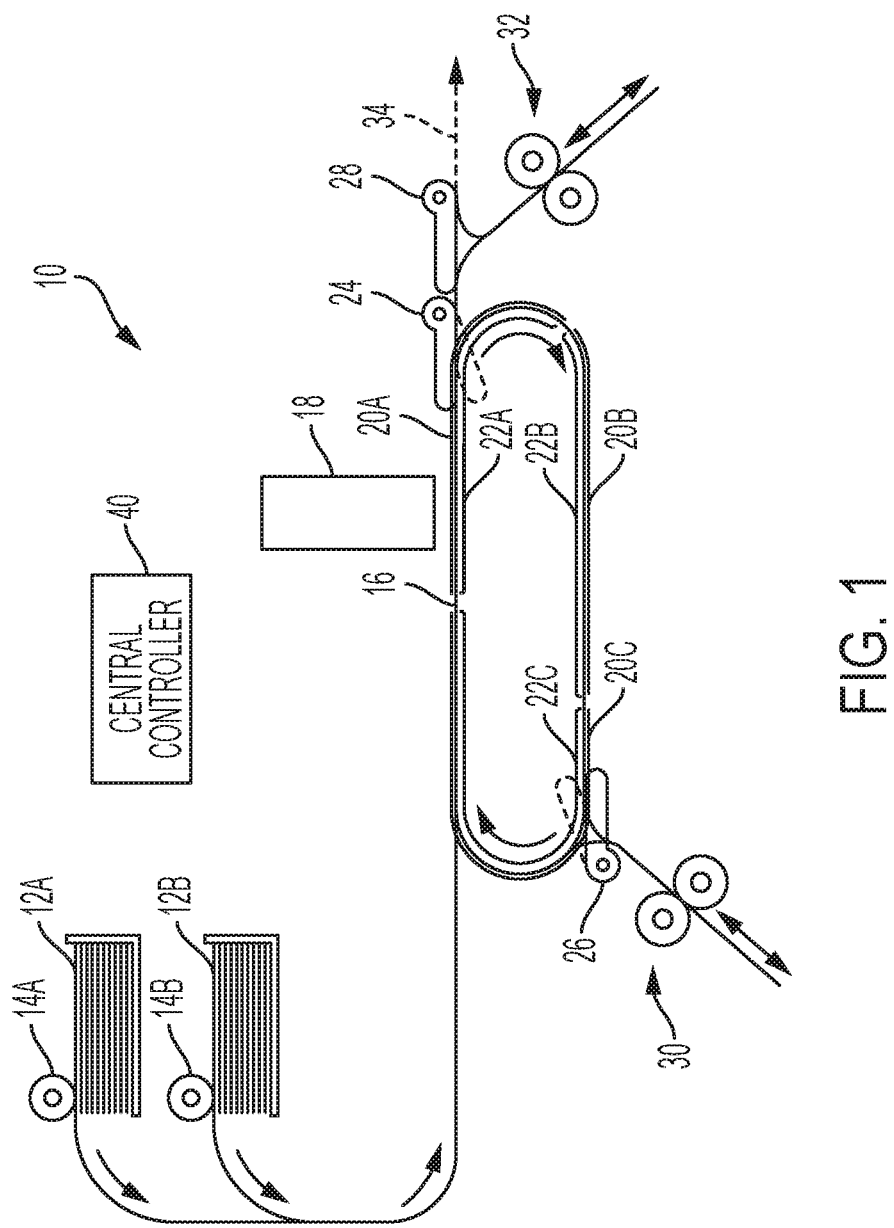
FIG. 1 is a simplified elevational view showing the relevant parts of a duplex printing system, in accordance with some embodiments of the present disclosure.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

"Printer," "printer system," "printing system," "printer device," and "printing device" as used herein encompass any apparatus, such as a digital copier, bookmaking machine, facsimile machine, multi-function machine, etc., which performs a print outputting function for any purpose. Furthermore, as used herein, "sheet," "web," "substrate," and "printable substrate" refer to, for example, paper, transparencies, parchment, film, fabric, plastic, photo-finishing papers or other coated or non-coated substrate media in the form of a web upon which information or markings can be visualized and/or reproduced.

As used herein, "image" and "printed image" is intended to be broadly construed as any picture, text, character, indicia, pattern or any other printed matter. Printed images can include but are not limited to logos, emblems, and symbols.

The term "cross product" as used herein refers to a finite state machine (FSM) that is composed from a pair of finite state machines. The cross product states comprise all pairs of states from the component FSMs, i.e., their mathematical cross product. Cross product transitions are similarly composed from component the FSM transitions. A pair of transitions on the same symbol, one transition from each component FSM, corresponds to a cross product transition on that symbol. The states in the cross product transition are paired states taken from the component transitions.

The term "cycle" as used herein refers to a sequence of connected FSM transitions which begins and ends in the same state.

Referring now to the figures, FIG. 1 is a simplified elevational view showing the relevant parts of duplex printing system 10, in accordance with some embodiments of the present disclosure. Printing system 10 generally comprises one or more feeder trays (e.g., feeder trays 12A-B), one or more feeders (e.g., feeders 14A-B), duplex loop 16, marker or print head 18, one or more gates (e.g., gates 24, 26, and 28), and one or more inverters (e.g., inverters 30 and 32). Printing system 10 communicates with central controller 40 to implement the printing path schedule created by scheduler program 140. Printing system 10 is capable of simplex or duplex output, in which a stream of images (or digital video signals representative of images) desired to be printed causes the desired images to be formed on a selected side of a print sheet. The particular embodiment shown in FIG. 1 illustrates an ink-jet printer; however, it should be appreciated that the present disclosure could be implemented on other types of image-creation technologies, such as electrostatographic or xerographic printers (i.e., toner).

Feeders 14A and 14B are operatively arranged to feed sheets on which to print images from feeder trays 12A and 12B to duplex loop 16, respectively. The sheets in feeder trays 12A and 12B may differ in, for example, size, color, or the presence of a pre-printed letterhead. When it is desired to create an image on a sheet, a sheet of a desired type is drawn from a feeder tray such as feeder tray 12A or feeder tray 12B, such as by respective feeders 14A or 14B, and the individual sheet is fed onto duplex loop 16. It should be appreciated that printing system 10 may comprise any number of feeders and feeder trays. Feeders 14A and 14B communicate with central controller 40 such that they feed sheets to duplex loop 16 in proper synchronization with the printing path schedule created by scheduler program 140. For example, central controller 40 sends a signal to feeder 14A to feed two sheets from feeder tray 12A to duplex loop 16 at time $t_1$ and time $t_2$, and a signal to feeder 14B to feed one sheet from feeder tray 12B to duplex loop 16 at time $t_3$.

Duplex loop 16 generally comprises an endless belt which is capable, by means of friction, static electricity, vacuum, or other means, of retaining a plurality of sheets (e.g., sheets 20A-C) thereon, thereby retaining a particular sheet until it is time for the sheet to receive an image on the side of the sheet facing outwardly from the belt of the duplex loop 16. In the embodiment shown in FIG. 1, it is intended that sheets "ride" on the outer surface of the belt of the duplex loop 16. Along one portion of duplex loop 16, the belt of the duplex loop 16 comes into close contact with marker or print head 18, which may transfer an image onto the side of the sheet facing outwardly from the belt of duplex loop 16. In some embodiments, marker or print head 18 comprises one or more ink jet print heads. In some embodiments, marker or print head 18 comprises a photoreceptor belt, a transfer corotron, and an imager in accordance for use with toner (i.e., xerography). Marker 18 transfers the image onto a side of a sheet. If at this point the sheet having the image thereon is desired to be output from the system, a device such as gate 24, a simple design of which is shown in FIG. 1, but which may be of any number of designs known in the art, will cause the sheet to be disengaged from duplex loop 16 and output from printing system 10 such as through the path indicated by arrow 28. The output sheet can either be directly output into a tray for pickup by the user, or may be sent to a sorting or stapling device according to the larger architecture of the printing apparatus. In some embodiments, the sheet may be passed through a dryer as is known in the art.

To create a duplex print, that is, a print having one desired image on one side thereof and another desired image on the other side thereof, it is necessary to make the other side of the sheet available to marker 18, by causing the other side of the sheet to face outward while the sheet rides on the outside of duplex loop 16. For this purpose, printing system 10 comprises inverter 30 operatively arranged along duplex loop 16. Inverter 30 is operatively arranged to remove a sheet from duplex loop 16 which comprises an image already arranged on the outward-facing side thereof, and turn the sheet over so that the other, "non-printed" side of the sheet faces outward from the belt of duplex loop 16. Thus, inverter 30 removes the sheet from duplex loop 16, feeding it in one direction, and then delivering the sheet back to duplex loop 16 (as shown by the double-headed arrow next to inverter 30) to turn the sheet over (i.e., rotate the sheet 180°). Duplex loop 16 then re-feeds the sheet for another cycle so that marker 18 can place another desired image on the other side thereof. Gate 26 is operatively arranged to selectably cause the sheet to enter inverter 30, depending on whether the particular sheet passing therepast is a simplex print, the first side of a duplex print, or a second side of a duplex print.

As shown in FIG. 1, after a front side f image is placed on a sheet at marker 18, this sheet travels around duplex loop 16, is picked off duplex loop 16 by gate 26, inverted by inverter 30, and placed back on duplex loop 16, where the inverted sheet will again become available to receive an image from marker 18 at a time in the future after the inverted sheet makes its way around duplex loop 16. Thus, for a duplex print, the creation of the front side f image by marker 18 must be spaced by a fixed time period from the creation of the back side d image on the same sheet; this time difference is ultimately dependent on the size of the sheet relative to the overall length of duplex loop 16. Given a fixed-speed paper path, the only sheet-size-related difference is due to inverter 30; if a longer sheet has to be driven farther into inverter 30 to invert the sheet, the extra length in and out of the inverter 30 changes the length of the duplex path. Additionally, the longer duplex loop 16 is, the more time that will be required for the back side d of the sheet to come around to marker 18, and therefore a longer time spacing would be required between the outputting of the front side f image from marker 18 and the back side d image.

Furthermore, printing 10 may further comprise additional output inverter 32. If, for example, after a duplex print receives its back side d image, it is desired that the sheet be output such that the front side f is exposed, the sheet can enter output inverter 32. Output inverter 32 is operatively arranged to invert a sheet exiting duplex loop 16. Gate 28 is operatively arranged to selectably cause the sheet to enter inverter 32, depending on whether the particular sheet passing therepast is a simplex print, the first side of a duplex print, or a second side of a duplex print.

In a practical application of a duplex printer, an operating parameter which is more useful than the timing between the production of particular images is the number of "pitches" along the length of duplex loop 16. A "pitch" is a length of duplex loop 16 that corresponds to an image of the size to be printed, such as 8.5×11 inches or "A4." For example, as shown in FIG. 1, duplex loop 16 comprises a total length capable of holding a plurality of sheets. This space is broken down into sheet spaces or pitches. In some embodiments, duplex loop 16 comprises three pitches (or total available sheet spaces), pitches 22A-C. As such, duplex loop 16 is capable of holding a maximum of three sheets, sheets 20A-C, at a given moment in time. It is a desired feature of the present disclosure to optimize the printing output of printing system 10. Therefore, it is desired that all three pitches 22A-C are filled with a respective sheet 20A-C at all times. However, and as was described above, this is not always possible, especially with both simplex and duplex printing. As also previously described, a greedy print schedule aims to output sheets as soon as possible, whereas an optimal print schedule aims to reduce overall run time of printing system 10 by reducing the number of blank pitches (i.e., the last sheet exits the duplex loop as soon as possible). Thus, it is an object of the present disclosure to assess and compare the greedy schedule to the optimal schedule to produce a measurable that can be used for optimization purposes, as will be discussed in greater detail below.

Figure 2:
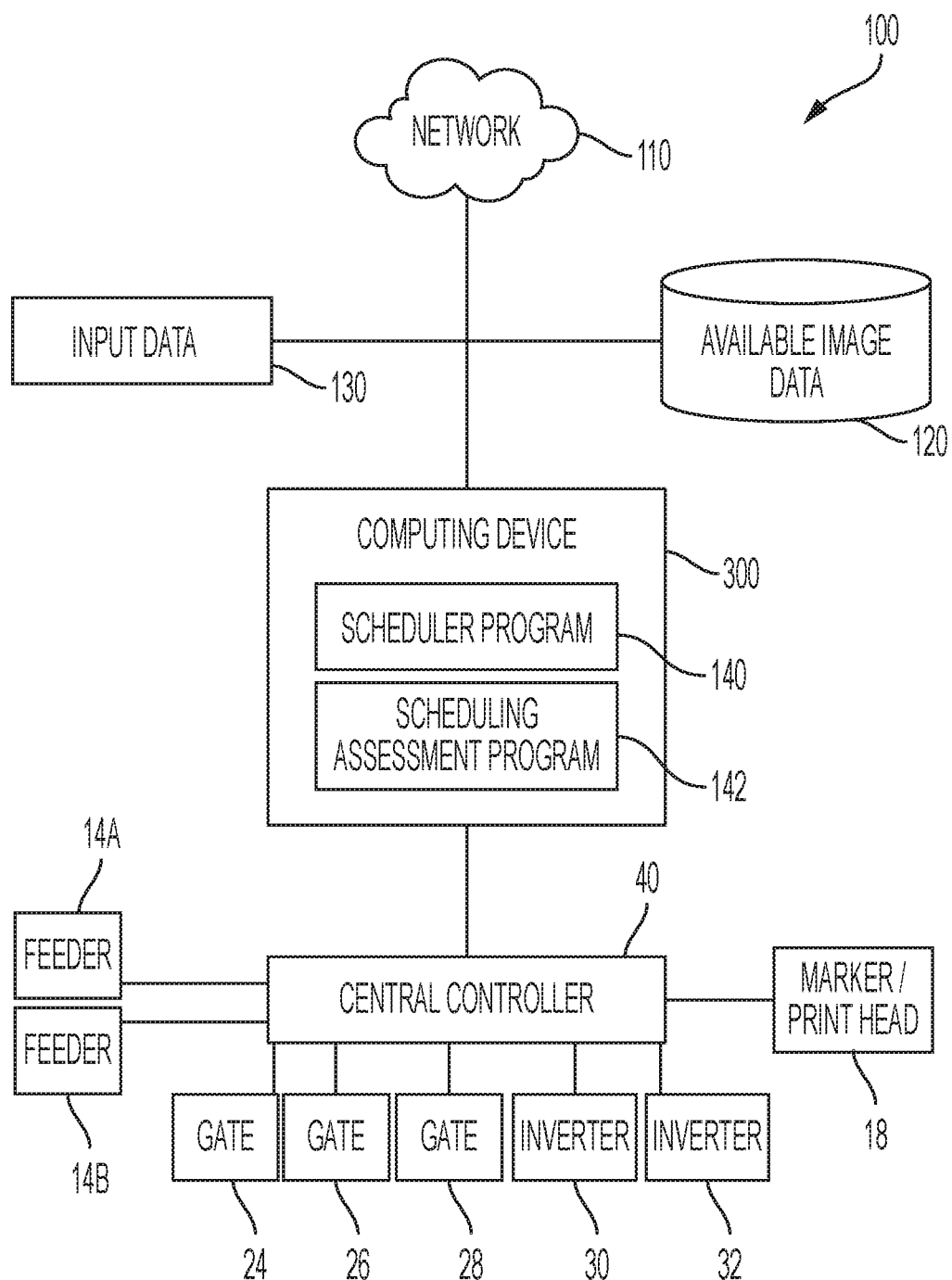
FIG. 2 is a functional block diagram illustrating an environment, in accordance with some embodiments of the present disclosure.

FIG. 2 is a functional block diagram illustrating scheduling assessment environment 100, in accordance with some embodiments of the present disclosure. FIG. 2 provides only an illustration of one implementation, and does not imply any limitations with regard to the environments in which different embodiments may be implemented. Many modifications to the depicted environment may be made by those skilled in the art without departing from the scope of the disclosure as recited by the claims. In some embodiments, scheduling assessment environment 100 includes computing device 300, a database or available image data 120, and user input data 130 all of which are connected to network 110. In some embodiments, scheduling assessment environment 100 further comprises central controller 40, which communicates with computing device 300 and/or scheduler program 140 and/or scheduling assessment program 142. Central controller 40 is the interface between scheduler program 140 (i.e., software) and the various relevant components of printing system 10 (hardware), as will be described in greater detail below.

Network 110 can be, for example, a local area network (LAN), a wide area network (WAN) such as the Internet, or a combination of the two, and can include wired, wireless, or fiber optic connections.

Computing device 300 may be a hardware device that produces printing schedules based on available image data 120 and/or input data 130 using scheduler program 140 and assesses the difference between greedy scheduling and optimal scheduling using scheduling assessment program 142. Computing device 300 is capable of communicating with network 110, available image data 120, and input data 130. In some embodiments, computing device 300 may include a computer. In some embodiments, computing device 300 may include internal and external hardware components, as depicted and described in further detail with respect to FIG. 4. In some embodiments, scheduler program 140 and/or scheduling assessment program 142 is implemented on a web server, which may be a management server, a web server, or any other electronic device or computing system capable of receiving and sending data. The web server can represent a computing system utilizing clustered computers and components to act as a single pool of seamless resources when accessed through a network. The web server may include internal and external hardware components, as depicted and described in further detail with respect to FIG. 4.

Scheduler program 140 receives requests for prints (e.g., duplex prints and simplex prints). The requests for prints includes input data related to one or more images to be printed. Scheduler program 140 can receive requests for prints and generate a printing schedule based on those requests. For example, in some embodiments, print requests are sent to available image data 120 via input data 130 (e.g., from one or more users in a network). Scheduler program 140 communicates with available image data 120 to retrieve such print requests and then creates either an optimal printing path schedule (i.e., a printing path schedule that has the lowest overall run time) or a greedy printing path schedule (i.e., a printing path schedule that assigns the next available pitch a sheet subject to it not interfering with other sheets in the path). Scheduler program 140 communicates with central controller 40 to properly operate the hardware components of printing system in accordance with the created optimized printing path schedule and/or adjusted printing path schedule. Scheduler program 140 can generally include any software capable of generating a printing path schedule and communicating with database 120, input record data 130, network 110, and central controller 40. It should be appreciated that scheduler program 140 can communicate and/or work in conjunction with scheduling assessment program 142 in order to output a specific printing schedule (i.e., greedy or optimal).

Scheduling assessment program 142 receives information associated with print requests. For example, scheduling assessment program 142 may receive the same requests for prints (e.g., duplex prints and simplex prints) received by scheduler program 140, or receive information from scheduler program 140. Scheduling assessment program 142 can receive requests for prints and generate various printing schedules based on those requests. For example, in some embodiments, print requests are sent to available image data 120 via input data 130 (e.g., from one or more users in a network). Scheduling assessment program 142 communicates with available image data 120 to retrieve such print requests and then creates a hypothetical optimal printing path schedule (i.e., a printing path schedule that has the lowest overall run time) and greedy printing path schedule (i.e., a printing path schedule that assigns the next available pitch a sheet subject to it not interfering with other sheets in the path). Scheduling assessment program 142 is capable of, based on the print requests, assessing the difference between optimal scheduling of the print requests and greedy scheduling of the print requests, as will be described in greater detail below. Scheduling assessment program 142 may communicate with an external source (i.e., remote location) or with scheduler program 140 to indicate a scheduling assessment. Scheduling assessment program 142 can generally include any software capable of generating a scheduling assessment and communicating with database 120, input record data 130, network 110, scheduler program 140, and/or an external receiver.

Available image data 120 is a central storage for printing requests (i.e., data that represents images to be printed on front side f and/or back side d of one or more sheets). Available image data 120 can be implemented using any non-volatile storage medium known in the art. For example, authentication database can be implemented with a tape library, optical library, one or more independent hard disk drives, or multiple hard disk drives in a redundant array of independent disks (RAID). In some embodiments, available image data 120 receives print requests from a user via input data 130. In some embodiments, available image data 120 contains a set of data related to print requests (e.g., generic images that may be used very frequently).

Input data 130 is data inputted by a user, for example, a simplex or duplex print request. The user may submit input data 130, or designate the appropriate data to be provided by available image data 120 (e.g., generic images that may be stored in available image data 120). The system, namely, scheduling assessment environment 100, is responsive to input data 130 provided by a user or read from available image data 120. As will be explained in greater detail below, scheduling assessment program 140 receives one or more printing requests and their paper path timing constraints from available image data 120 and/or input data 130 and generates a printing path scheduling assessment (i.e., greedy versus optimal printing path schedules).

Central controller 40 is the interface between scheduler program 140 and the hardware components of printing system 10. Central controller 40 communicates with scheduler program 140 to implement the chosen printing path schedule on printing system 10. For example, in some embodiments, central controller 40 may communicate with one or more feeders (e.g., feeders 14A-B), marker or print head 18, one or more gates (e.g., gates 24, 26, and 28), one or more inverters (e.g., inverters 30 and 32), to carry out the printing path schedule created by scheduler program 140.

Figure 3:
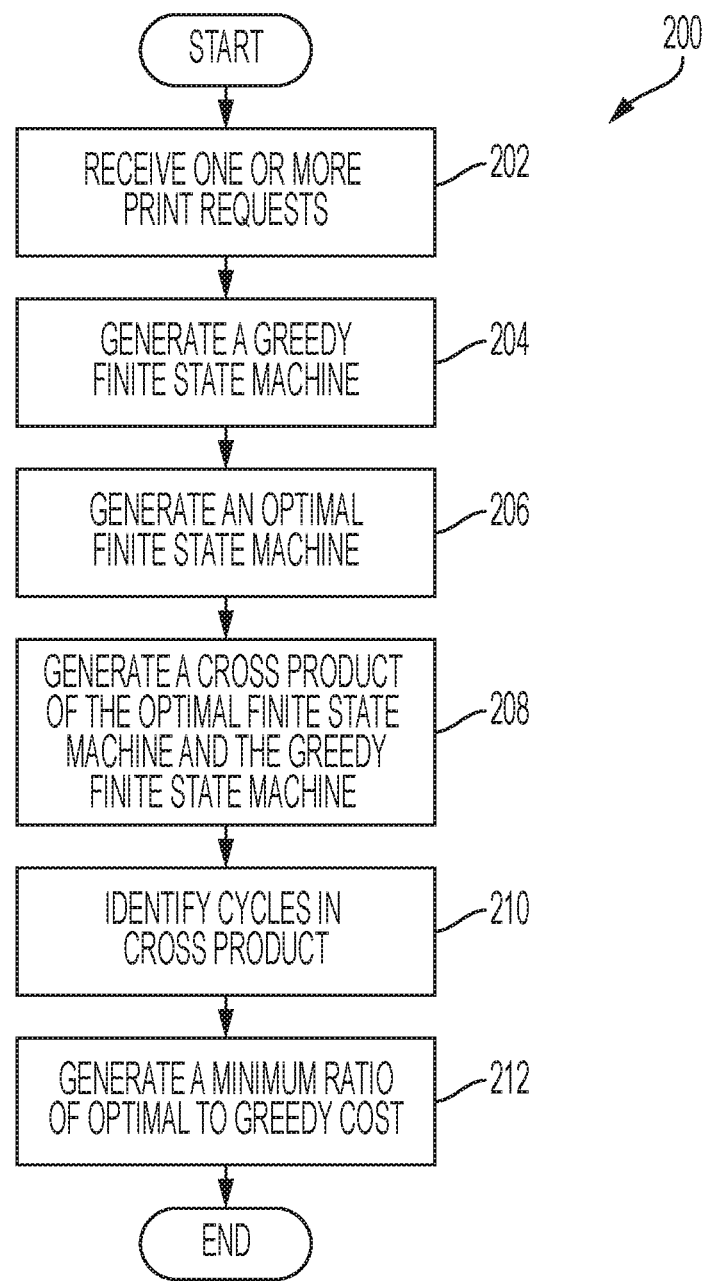
FIG. 3 is a flow chart depicting operational steps for assessing the printing path scheduling possibilities, in accordance with some embodiment of the present disclosure.

FIG. 3 is a flow chart depicting operational steps for generating a greedy versus optimal scheduling assessment, in accordance with some embodiments of the present disclosure.

In step 202, scheduling assessment program 142 receives one or more print requests. The print requests may come from continuous communication between scheduling assessment program 142 and available image data 120 (i.e., scheduling assessment program 142 continuously pulls image data from available image data 120 at a certain time interval, such as every five seconds), from a specific signal sent from available image data 120 to scheduling assessment program 142, or from communication between scheduling assessment program 142 and scheduler program 140. In some embodiments, there are a plurality of print requests received by scheduling assessment program 142 at a given time or spread about one or more times. Scheduling assessment program 142 uses the one or more print requests and/or data associated with the one or more print requests to generate FSM scheduling models.

To generate FSM scheduling, transition diagrams are used according to the following description. States labels have the format "xxx" with x being 0 or 1. They represent the presence of sheets in the ending portion of the paper path which is accessible to the scheduler. For example, a full-path stat has the label "111". Transition labels have the format "c,u" where c denotes the print request (or capability), either "s" for simplex or "d" for duplex, and u is the number of sheet units or pitches (i.e., the cost) added to the end of the schedule by the transition. For simplicity throughout this disclosure, the initial print path is assumed to be full.

Figure 5:
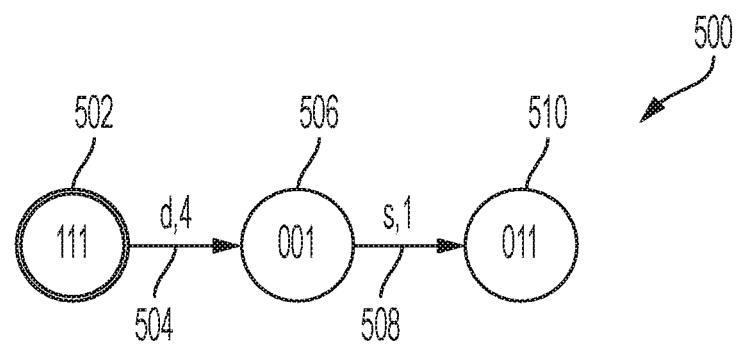
FIG. 5 is a schematic view of a transition diagram, in accordance with some embodiments of the present disclosure.

FIG. 5 shows an example transition diagram 500 for producing the schedule for a duplex followed by a simplex according to the below nomenclature.

f _ _ d s

Transition diagram 500 comprises states 502, 506, and 510 and transitions 504 and 508. As shown, initial state 502 comprises the format 111 indicating a full print path (i.e., every pitch on duplex loop 16 is occupied by a sheet). Transition 504 comprises the format d,4 indicating that a duplex is scheduled and it adds four additional pitches to the end of the schedule. State 506 comprises format 001 indicating that only one sheet remains on the print path (i.e., there are two pitches available for scheduling another sheet). Transition 508 comprises the format s,1 indicating that a simplex is scheduled and it adds only one additional pitches to the end of the schedule. State 510 comprises format 011 indicating that two sheets remain on the print path (i.e., there is one pitch available for scheduling another sheet). It should be appreciated that with respect to the state labels, scheduling assessment program 142 can only look at the last three pitches, which is the current state of the print path. This is because scheduling assessment program 142 can only form a transition based on the current state of the print path.

In step 204, scheduling assessment program 142 generates a greedy finite state machine (FSM) for the one or more print requests.

Figure 6:
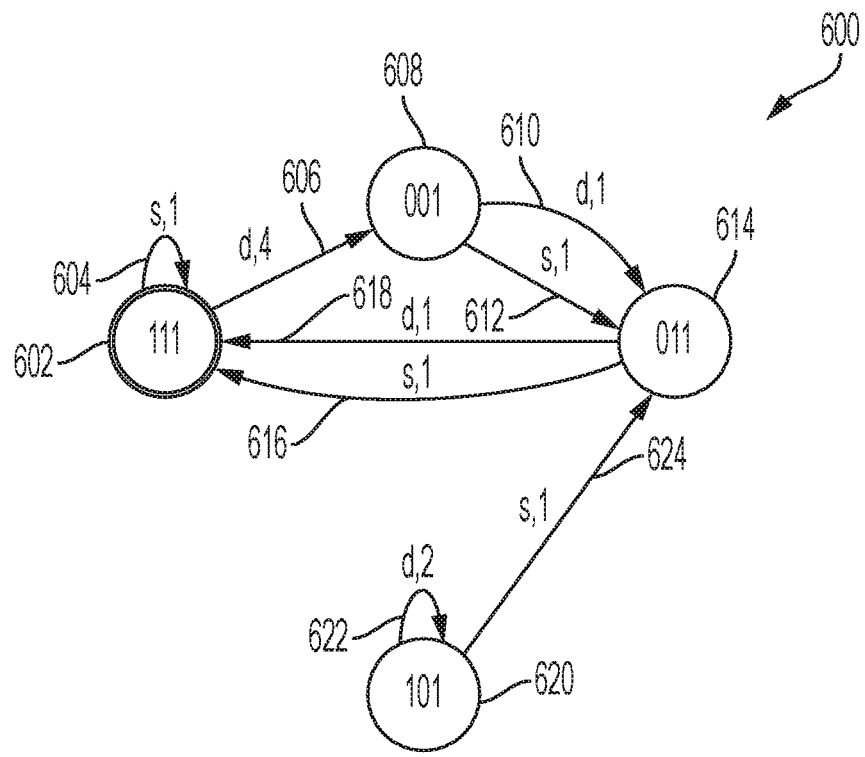
FIG. 6 is a schematic view of a greedy finite state machine transition diagram, in accordance with some embodiments of the present disclosure.

FIG. 6 shows a greedy FSM transition diagram 600. In the greedy FSM, the transition units are the smallest possible given the state of the paper path. As previously described, greedy schedules are deterministic—in any state there is only one transition possibility. Greedy FSM transition diagram 600 comprises states 602, 608, 614, and 620 and transitions 602, 604, 606, 610, 612, 616, 618, 622, and 624. State 602 comprises the format 111 indicating a full print path. Transition 604 comprises the format s,1 indicating that a simplex is scheduled and it adds one additional pitch to the end of the schedule. Alternatively, transition 606 comprises the format d,4 indicating that a duplex is scheduled and it adds four additional pitches to the end of the schedule. State 608 comprises the format 001 indicating that only one sheet remains on the print path. Transition 610 comprises the format d,1 indicating that a duplex is scheduled and it adds only one additional pitch to the end of the schedule. This would occur by placing front side f in the first open pitch of state 608 such that the back side d falls into the pitch after the third pitch of state 608, or the third pitch in state 614. Transition 612 comprises the format s,1 indicating that a simplex is scheduled and it adds one additional pitch to the end of the schedule. State 614 comprises the format 011 indicating that two sheets remain on the print path and there is only one pitch available for scheduling. Transition 616 comprises the format s,1 indicating that a simplex is scheduled and it adds one additional pitch to the end of the schedule. Transition 618 comprises the format d,1 indicating that a duplex is scheduled and it adds one additional pitch to the end of the schedule. State 620 comprises the format 101 indicating that two sheets remain on the print path and there is only one pitch (i.e., the second pitch) available for scheduling. Transition 622 comprises the format d,2 indicating that a duplex is scheduled and it adds two additional pitches to the end of the schedule. Transition 624 comprises the format s,1 indicating that a simplex is scheduled and it adds one additional pitches to the end of the schedule.

In step 206, scheduling assessment program 142 generates an optimal FSM for the one or more print requests.

Figure 7:
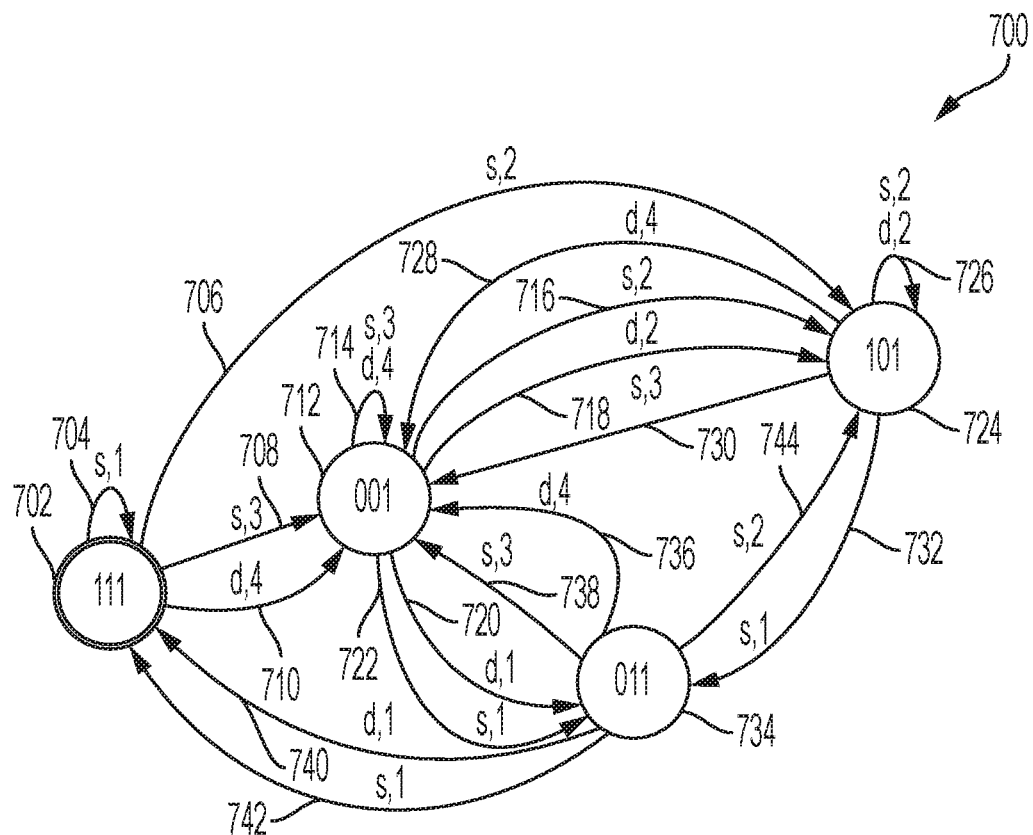
FIG. 7 is a schematic view of an optimal finite state machine transition diagram, in accordance with some embodiments of the present disclosure.

FIG. 7 shows an optimal FSM transition diagram 700. In the optimal FSM, there are multiple transitions out of a state for a given capability. The transition units range from the greedy value up to the maximum useful number. These support all of the viable schedules of any combination of future sheets. As previously described, optimal scheduling is non-deterministic meaning there are multiple transition possibilities. Optimal FSM transition diagram 700 comprises states 702, 712, 724, and 734 and transitions 704, 706, 708, 710, 714, 716, 718, 720, 722, 726, 728, 730, 732, 736, 738, 740, and 742. State 702 comprises the format 111 indicating a full print path. Transition 704 comprises the format s,1 indicating that a simplex is scheduled and it adds one pitch to the end of the schedule. Transition 706 comprises the format s,2 indicating that a simplex is scheduled and it adds two pitches to the end of the schedule. This would occur if the simplex sheet was delayed one pitch, for example, _ s, as previously described. Transition 708 comprises the format s,3 indicating that a simplex is scheduled and it adds two pitches to the end of the schedule. This would occur if the simplex sheet was delayed two pitches, for example, _ _ s, as previously described. Transition 710 comprises the format d,4 indicating that a duplex is scheduled and it adds four pitches to the end of the schedule. State 712 comprises the format 001 indicating that only one sheet remains on the print path. Transition 714 comprises the format s,3 indicating that a simplex is scheduled and it adds three pitches to the end of the schedule (delay by two pitches). Transition 714 also comprises the format d,4 indicating that a duplex is scheduled and it adds four pitches to the end of the schedule. Transition 716 comprises the format s,2 indicating that a simplex is scheduled and it adds two pitches to the end of the schedule (delay by one pitch). Transition 718 comprises the format d,2 indicating that a duplex is scheduled and it adds two pitches to the end of the schedule. Transition 720 comprises the format d,1 indicating that a duplex is scheduled and it adds one pitch to the end of the schedule. Transition 722 comprises the format s,1 indicating that a simplex is scheduled and it adds one pitch to the end of the schedule. State 724 comprises the format 101 indicating that two sheets remain on the print path and only the middle pitch is available for scheduling. Transition 726 comprises the format s,2 indicating that a simplex is scheduled and it adds two pitches to the end of the schedule (delay by one pitch). Transition 726 also comprises the format d,2 indicating that a duplex is scheduled and it adds two pitches to the end of the schedule. Transition 728 comprises the format d,4 indicating that a duplex is scheduled and it adds four pitches to the end of the schedule. Transition 730 comprises the format s,3 indicating that a simplex is scheduled and it adds three pitches to the end of the schedule (delay by two pitches). Transition 732 comprises the format s,1 indicating that a simplex is scheduled and it adds one pitch to the end of the schedule. State 734 comprises the format 011 indicating that there are two sheets remaining on the print path and only pitch one is available for scheduling. Transition 736 comprises the format d,4 indicating that a duplex is scheduled and it adds four pitches to the end of the schedule. Transition 738 comprises the format s,3 indicating that a simplex is scheduled and it adds three pitches to the end of the schedule (delay by two pitches). Transition 740 comprises the format d,1 indicating that a duplex is scheduled and it adds one pitch to the end of the schedule. Transition 742 comprises the format s,1 indicating that a simplex is scheduled and it adds one pitch to the end of the schedule. Transition 744 comprises the format s,2 indicating that a simplex is scheduled and it adds two pitches to the end of the schedule.

In step 208, scheduling assessment program 142 generates the cross product (CP) of the optimal FSM and the greedy FSM.

Figure 8:
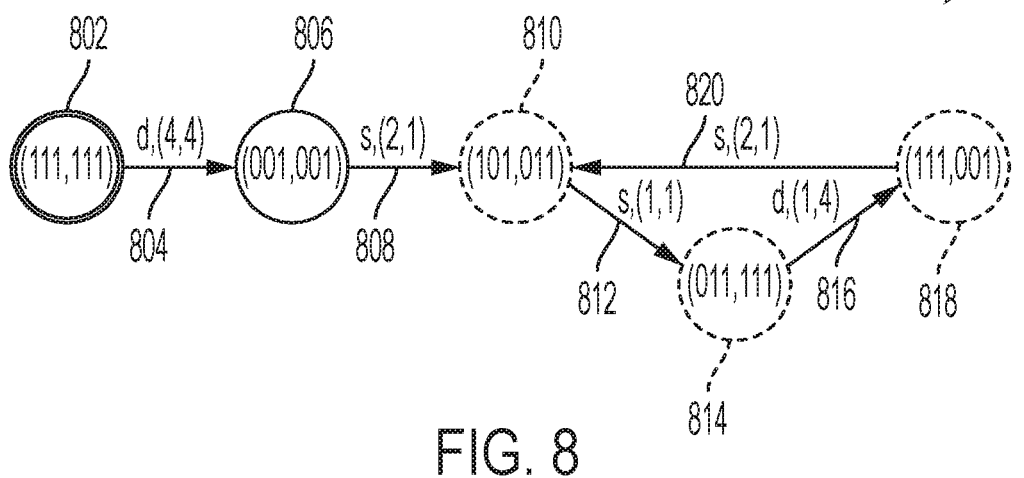
FIG. 8 is a schematic view showing a cross product analysis diagram, in accordance with some embodiments of the present disclosure; and, FIG. 9 is a schematic view of a full cross product finite state machine for the greedy finite state machine shown in FIG. 6 and the optimal finite state machine shown in FIG. 7.

FIG. 8 shows CP analysis diagram 800. CP analysis diagram 800 is used to find the minimum ratio cycle. CP analysis diagram 800 comprises states 802, 806, 810, 814, and 818 and transitions 804, 808, 812, 816, and 820. States 810, 814, and 818 indicate the cycle nodes. The state labels have the format "(optimal state, greedy state)," indicating that the state is the combination of the respective optimal and greedy FSM states. The transition labels have the format "capability, (optimal units, greedy units)," where the units are taken from the capability transitions out of the component states. For example, in state 802, (111,111) is the combination of the full states. The optimal FSM duplex transition (shown in transition 804) from the full state (state 802) leads to state 806 including the format 001, with a unit value of 4. The same is true of the greedy FSM. Therefore, the duplex transition from the CP full state 802 including the format (111,111) leads to the combined destination state 806 including the format (001,001), with combined unit value (4,4). In transition 808, a simplex is scheduled and under the optimal schedule two pitches are added to the end of the schedule, whereas under the greedy schedule one pitch is added to the end of the schedule. Transition 808 leads to state 810 comprising (101,011). State 810 is considered a cycle node. Notice that transitions 812, 816, and 820 interconnect states 810, 814, and 818, forming a "cycle." Transition 812 comprises the format s,(1,1) indicating that a simplex is scheduled and under both the optimal schedule and the greedy schedule one pitch is added to the end of the schedule. State 814 comprises the format (011,111) indicating that in the optimal schedule there is one available pitch (i.e., the first pitch) for scheduling, whereas in the greedy schedule no pitches are available (i.e., all pitches are occupied by a sheet). Again, state 814 is considered a cycle node. Transition 816 comprises the format d,(1,4) indicating a duplex is scheduled and under the optimal schedule one pitch is added to the end of the schedule and under the greedy schedule four pitches are added to the end of the schedule. State 818 comprises the format (111,001) indicating that in the optimal schedule there are no available pitches and in the greedy schedule there are two available pitches. Transition 820 comprises the format s,(2,1) indicating that a simplex is scheduled and under the optimal schedule two pitches are added to the end of the schedule and under the greedy schedule one pitch is added to the end of the schedule.

In step 210, scheduling assessment program 142 identifies cycles in the cross product. As previously described with respect to FIG. 8, the cycle of CP analysis diagram 800 includes states 810, 814, and 818, which are considered cycle nodes because together with transitions 812, 816, and 820 they form a cycle. The cycle could continue indefinitely as long as the scheduling of a duplex followed by two simplexes continues.

In step 212, scheduling assessment program 142 calculates the minimum ratio of the optimal cost to greedy cost over all cycles. To calculate the minimum ratio, the sums of transition values along the cycle are added together. For example, for the optimal schedule, the sum of the transition values for the cycle (i.e., for transitions 812, 816, and 820) is 4, calculated by 1+1+2. For the greedy schedule, the sum of the transition values for the cycle is 6, calculated by 1+4+1. The ratio of optimal cost to greedy cost is 4/6 and thus the minimum cycle ratio of optimal cost to greedy cost is 2/3. Scheduling a job that is any number of sets comprising a duplex followed by two simplexes follows this path.

Figure 9:
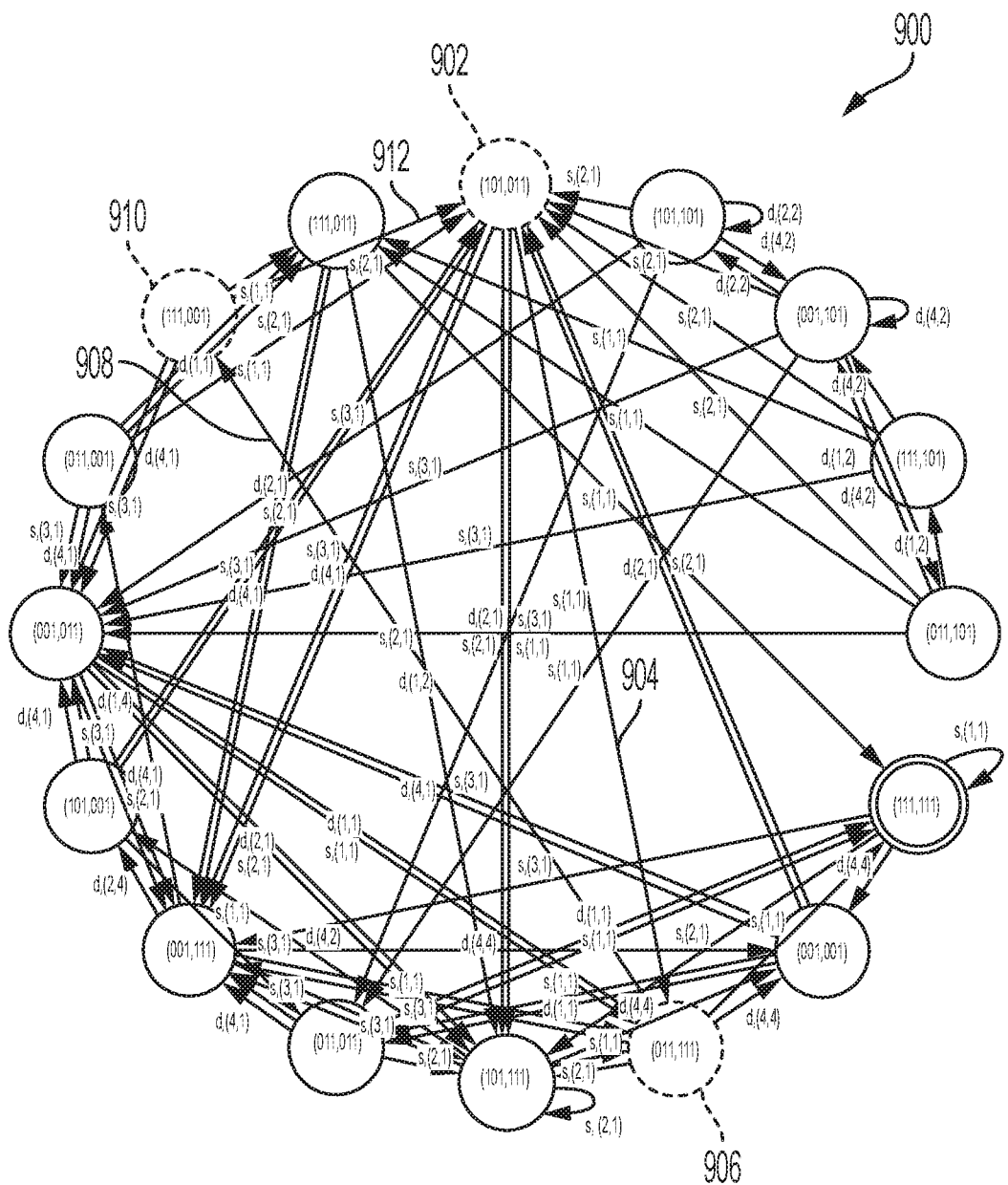

FIG. 9 shows full CP FSM 900. As shown, full CP FSM 900 comprises cycle nodes or states 902, 906, and 910 and cycle transitions 904, 908, 912.

Figure 4:
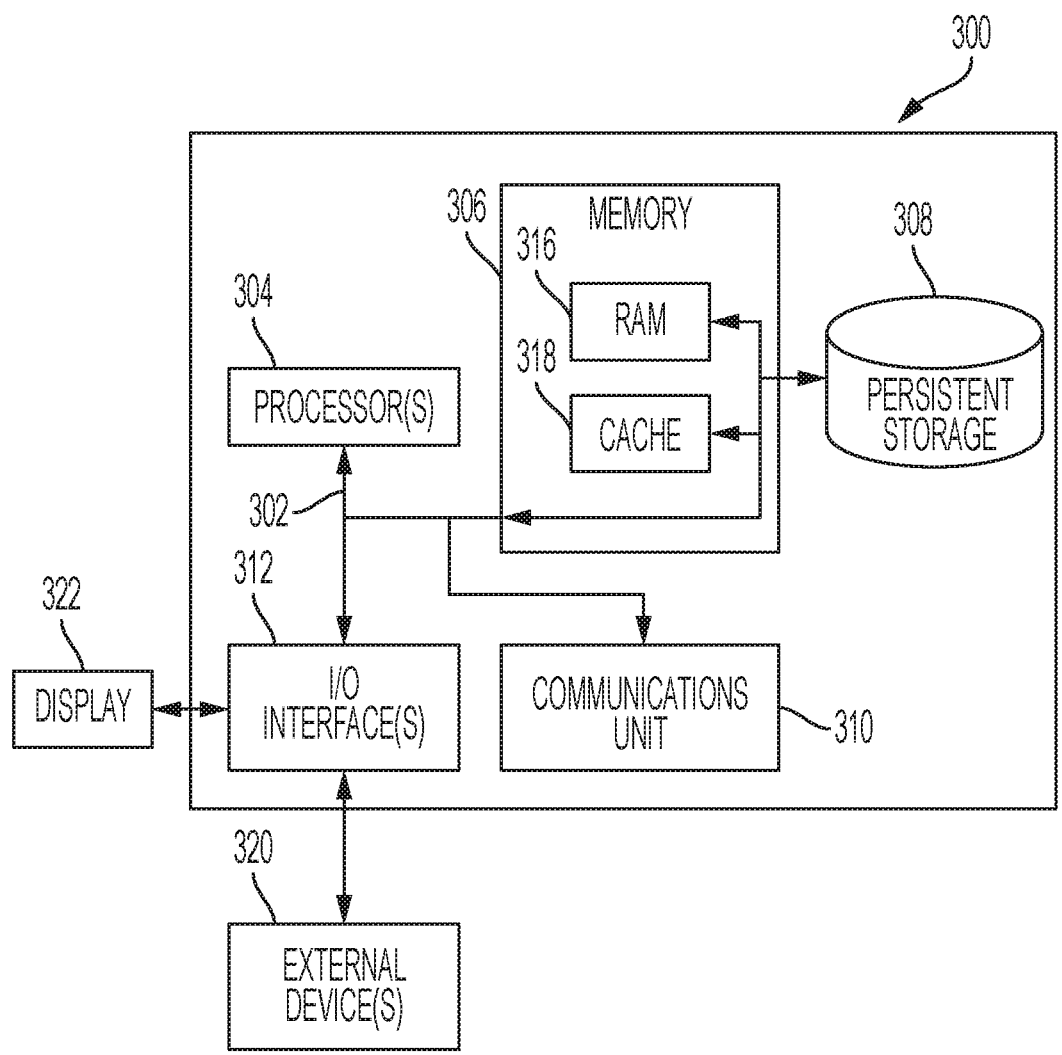
FIG. 4 is a block diagram of internal and external components of a computer system, in accordance with some embodiments of the present disclosure.

FIG. 4 is a block diagram of internal and external components of computing system 300, which is representative of the computing device of FIG. 2, in accordance with an embodiment of the present disclosure. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 300 includes communications fabric 302, which provides for communications between one or more processing units 304, memory 306, persistent storage 308, communications unit 310, and one or more input/output (I/O) interfaces 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 316 and cache memory 318. In general, memory 306 can include any suitable volatile or non-volatile computer readable storage media. Software is stored in persistent storage 308 for execution and/or access by one or more of the respective processors 304 via one or more memories of memory 306.

Persistent storage 308 may include, for example, a plurality of magnetic hard disk drives. Alternatively, or in addition to magnetic hard disk drives, persistent storage 308 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 310 provides for communications with other computer systems or devices via a network. In this exemplary embodiment, communications unit 310 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present disclosure can be downloaded to computing device 300 through communications unit 310 (i.e., via the Internet, a local area network, or other wide area network). From communications unit 310, the software and data can be loaded onto persistent storage 308.

One or more I/O interfaces 312 allow for input and output of data with other devices that may be connected to computing device 300. For example, I/O interface 312 can provide a connection to one or more external devices 320 such as a keyboard, computer mouse, touch screen, virtual keyboard, touch pad, pointing device, or other human interface devices. External devices 320 can also include portable computer readable storage media such as, for example, thumb drives, portable optical or magnetic disks, and memory cards. I/O interface 312 also connects to display 322.

Display 322 provides a mechanism to display data to a user and can be, for example, a computer monitor. Display 322 can also be an incorporated display and may function as a touch screen, such as a built-in display of a tablet computer.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Printing system
12A Feeder tray
12B Feeder tray
14A Feeder
14B Feeder
16 Duplex loop
18 Marker (or print head)
20A Sheet
20B Sheet
20C Sheet
20D Sheet
20E Sheet
22A Pitch (or sheet space)
22B Pitch (or sheet space)
22C Pitch (or sheet space)
22D Pitch (or sheet space)
22E Pitch (or sheet space)
24 Gate
26 Gate
28 Gate
30 Inverter
32 Inverter
34 Arrow
40 Central controller
100 Scheduling assessment environment
110 Network
120 Available image data
130 Input data
140 Scheduler program
142 Scheduling assessment program
200 Flow chart
202 Step
204 Step
206 Step
208 Step
300 Computing device
302 Communications fabric
304 Processing units
306 Memory
308 Persistent storage
310 Communications unit
312 Input/output (I/O) interfaces
316 Random access memory (RAM)
318 Cache memory
320 External device(s)
322 Display
500 Transition diagram
502 State
504 Transition
506 State
508 Transition
510 State
600 Greedy finite state machine transition diagram
602 State
604 Transition
606 Transition
608 State
610 Transition
612 Transition
614 State
616 Transition
618 Transition
620 State
622 Transition
624 Transition
700 Optimal finite state machine transition diagram
702 State
704 Transition
706 Transition
708 Transition
710 Transition
712 State
714 Transition
716 Transition
718 Transition
720 Transition
722 Transition
724 State
726 Transition
728 Transition
730 Transition
732 Transition
734 State
736 Transition
738 Transition
740 Transition
742 Transition
744 Transition
800 Cross product analysis diagram
802 State
804 Transition
806 State
808 Transition
810 State
812 Transition
814 State
816 Transition
818 State
820 Transition
900 Full cross product analysis diagram 902 State
904 Transition
906 State
908 Transition
910 State
912 Transition

What is claimed is:

1. A method of generating a comparison of optimal sheet scheduling to greedy sheet scheduling, the method comprising:
receiving, by one or more computer processors, one or more print requests;
generating, by the one or more computer processors, a greedy finite state machine based on the one or more print requests;
generating, by the one or more computer processors, an optimal finite state machine based on the one or more print requests;
generating, by the one or more computer processors, a cross product of the optimal finite state machine and the greedy finite state machine;
identifying, by the one or more computer processors, a cycle in the cross product; and,
generating, by the one or more computer processors, a minimum ratio of optimal cost to greedy cost.

2. The method as recited in claim 1, wherein the one or more print requests comprise one or more simplex prints and/or one or more duplex prints.

3. The method as recited in claim 1, wherein the step of generating a greedy finite state machine comprises:
generating, by the one or more computer processors, a greedy print schedule by assigning the one or more print requests to first available pitches to create one or more first transitions and one or more first states.

4. The method as recited in claim 3, wherein the step of generating a greedy finite state machine further comprises:
assigning, by the one or more computer processors, the one or more first transitions, one or more first capabilities, and one or more first costs.

5. The method as recited in claim 4, wherein the step of generating an optimal finite state machine comprises:
generating, by the one or more computer processors, an optimal print schedule by assigning the one or more print requests to pitches based on a reduced overall operating time to create one or more second transitions and one or more second states; and,
assigning, by the one or more computer processors, the one or more second transitions one or more second capabilities and one or more second costs.

6. The method as recited in claim 5, wherein the step of generating a cross product of the optimal finite state machine and the greedy finite state machine comprises:
generating, by the one or more computer processors, a transition diagram including a plurality of cross product states and one or more cross product transitions.

7. The method as recited in claim 6, wherein the step of identifying a cycle in the cross product comprises:
identifying, by the one or more computer processors, cycle states of the plurality of cross product states; and,
identifying, by the one or more computer processors, cycle transitions of the one or more cross product transitions that connect the cycle states.

8. The method as recited in claim 7, wherein the step of generating a minimum ratio of optimal cost to greedy cost includes:
adding, by the one or more computer processors, the one or more first costs of the cycle transitions; and,
adding, by the one or more computer processors, the one or more second costs of the cycle transitions.

9. A computer system for generating a worst-case comparison of optimal sheet scheduling to greedy sheet scheduling, comprising:
one or more computer processors;
one or more computer readable storage media;
program instructions stored on the computer readable storage media for execution by at least one of the one or more computer processors, the program instructions comprising:
program instructions to receive input data related to one or more images to be printed;
program instructions to generate a greedy finite state machine based on the input data;
program instructions to generate an optimal finite state machine based on the input data;
program instructions to generate a cross product of the optimal finite state machine and the greedy finite state machine;
program instructions to identify a cycle in the cross product; and,
program instructions to generate a minimum ratio of optimal cost to greedy cost.

10. The computer system as recited in claim 9, wherein the program instructions to generate a greedy finite state machine comprise:
program instructions to generate a greedy print schedule by assigning the one or more print requests to first available pitches to create one or more first transitions and one or more first states; and,
program instructions to assign the one or more first transitions, one or more first capabilities, and one or more first costs.

11. The computer system as recited in claim 10, wherein the program instructions to generate an optimal finite state machine comprise:
program instructions to generate an optimal print schedule by assigning the one or more print requests to pitches based on a reduced overall operating time to create one or more second transitions and one or more second states; and,
program instructions to assign the one or more second transitions one or more second capabilities and one or more second costs.

12. The computer system as recited in claim 11, wherein the program instructions to generate a cross product of the optimal finite state machine and the greedy finite state machine comprise:
program instructions to generate a transition diagram including a plurality of cross product states and one or more cross product transitions.

13. The computer system as recited in claim 12, wherein the program instructions to identify a cycle in the cross product comprise:
program instructions to identify cycle states of the plurality of cross product states; and,
program instructions to identify cycle transitions of the one or more cross product transitions that connect the cycle states.

14. The computer system as recited in claim 13, wherein the program instructions to generate a minimum ratio of optimal cost to greedy cost include:
program instructions to add the one or more first costs of the cycle transitions; and,
program instructions to add the one or more second costs of the cycle transitions.

15. A computer program product for generating a worst-case comparison of optimal sheet scheduling and greedy sheet scheduling on a duplex printing system, the computer program product comprising:
   a computer readable storage medium and program instructions stored on the computer readable storage medium, the program instructions comprising:
      program instructions to receive input data related to one or more images to be printed;
      program instructions to generate a greedy finite state machine based on the input data;
      program instructions to generate an optimal finite state machine based on the input data;
      program instructions to generate a cross product of the optimal finite state machine and the greedy finite state machine;
      program instructions to identify a cycle in the cross product; and,
      program instructions to generate a minimum ratio of optimal cost to greedy cost.

16. The computer program product as recited in claim 15, wherein the program instructions to generate a greedy finite state machine comprise:
   program instructions to generate a greedy print schedule by assigning the one or more print requests to first available pitches to create one or more first transitions and one or more first states; and,
   program instructions to assign the one or more first transitions, one or more first capabilities, and one or more first costs.

17. The computer program product as recited in claim 16, wherein the program instructions to generate an optimal finite state machine comprise:
   program instructions to generate an optimal print schedule by assigning the one or more print requests to pitches based on a reduced overall operating time to create one or more second transitions and one or more second states; and,
   program instructions to assign the one or more second transitions one or more second capabilities and one or more second costs.

18. The computer program product as recited in claim 17, wherein the program instructions to generate a cross product of the optimal finite state machine and the greedy finite state machine comprise:
   program instructions to generate a transition diagram including a plurality of cross product states and one or more cross product transitions.

19. The computer program product as recited in claim 18, wherein the program instructions to identify a cycle in the cross product comprise:
   program instructions to identify cycle states of the plurality of cross product states; and,
   program instructions to identify cycle transitions of the one or more cross product transitions that connect the cycle states.

20. The computer program product as recited in claim 19, wherein the program instructions to generate a minimum ratio of optimal cost to greedy cost include:
   program instructions to add the one or more first costs of the cycle transitions; and,
   program instructions to add the one or more second costs of the cycle transitions.

* * * * *